US012709519B2

(12) United States Patent
Bitzi

(10) Patent No.: US 12,709,519 B2
(45) Date of Patent: Aug. 18, 2026

(54) HOISTWAY MODULE FOR FORMING A HOISTWAY COMPOSED OF STACKED HOISTWAY MODULES FOR AN ELEVATOR INSTALLATION

(71) Applicant: Inventio AG, Hergiswil (CH)

(72) Inventor: Raphael Bitzi, Lucerne (CH)

(*) Notice: Subject to any disclaimer, the term of this patent is extended or adjusted under 35 U.S.C. 154(b) by 0 days.

(21) Appl. No.: 18/872,852

(22) PCT Filed: Jun. 2, 2023

(86) PCT No.: PCT/EP2023/064774
§ 371 (c)(1),
(2) Date: Dec. 9, 2024

(87) PCT Pub. No.: WO2023/241941
PCT Pub. Date: Dec. 21, 2023

(65) Prior Publication Data

US 2025/0171274 A1 May 29, 2025

(30) Foreign Application Priority Data

Jun. 14, 2022 (EP) .................................... 22178837

(51) Int. Cl.
*B66B 13/30* (2006.01)
*B66B 11/00* (2006.01)
*B66B 13/06* (2006.01)

(52) U.S. Cl.
CPC ........ *B66B 13/301* (2013.01); *B66B 11/0005* (2013.01); *B66B 13/06* (2013.01)

(58) Field of Classification Search
CPC ......... B66B 13/301; B66B 9/187; B66B 9/16; B66B 11/0005; B66B 13/06
See application file for complete search history.

(56) References Cited

U.S. PATENT DOCUMENTS

2003/0111297 A1* 6/2003 Friedman .............. B66B 13/301
187/313

FOREIGN PATENT DOCUMENTS

| | | | | |
|---|---|---|---|---|
| CN | 208531965 U | * 2/2019 | | |
| CN | 111532954 A | 8/2020 | | |
| CN | 113697650 A | * 11/2021 | | B66B 11/00 |
| CN | 120759459 A | * 10/2025 | | |
| DE | 2635877 A1 | 2/1978 | | |
| DE | 20105144 U1 | * 7/2001 | | B66B 7/021 |
| EP | 1069066 B1 | 11/2005 | | |
| EP | 3747820 A1 | 12/2020 | | |
| EP | 4108619 A1 | * 12/2022 | | E04F 17/005 |
| JP | H03124691 A | 5/1991 | | |
| JP | 09132365 A | * 10/1995 | | |
| JP | 5730246 B2 | 6/2015 | | |
| WO | WO-2022233804 A1 | * 11/2022 | | E04F 17/005 |
| WO | WO-2023227822 A1 | * 11/2023 | | B66B 19/02 |

* cited by examiner

*Primary Examiner* — Diem M Tran
(74) *Attorney, Agent, or Firm* — Schlee IP International, PC; Alexander R. Schlee; Pascal A. Schlee

(57) ABSTRACT

A hoistway module that forms a portion of a hoistway of an elevator installation includes a first side wall having a door opening, a second side wall adjoining the first side wall at an angle other than 180° and a hoistway door arranged in the door opening and having a door sill. The door sill is fixed to the second side wall by a final door sill mount.

9 Claims, 3 Drawing Sheets

14 BASIC MODULE
16 BASIC MODULE
18 TOP MODULE
22 ELEVATOR CAR
30 COUNTERWEIGHT

HOISTWAY MODULE FOR FORMING A HOISTWAY COMPOSED OF STACKED HOISTWAY MODULES FOR AN ELEVATOR INSTALLATION

FIELD

The invention relates to a hoistway module for forming a hoistway composed of stacked hoistway modules for an elevator installation.

BACKGROUND

The creation of a hoistway of an elevator system, for example during the construction of a building, and the subsequent installation of the elevator system, is complex and thus associated with not inconsiderable costs. Usually, the hoistway is first created and the elevator installation together with its components such as the car, counterweight, drive machine and guide rails are subsequently installed in the hoistway. It has already been proposed to create the hoistway from a plurality of prefabricated modules in which the necessary components, such as hoistway doors, are already preassembled. Prefabrication and pre-assembly takes place in particular in a factory. This procedure requires less time at the construction site. In addition, it has positive effects on the quality of the installation and on the working safety of the installation personnel.

The applicant's international application having the application number PCT/EP2022/061744, WO 2022/233804 A1, describes a hoistway module and a method for placing a hoistway module on an underlying hoistway module to form a hoistway of an elevator installation. In a transport state of the hoistway module, a door sill of the hoistway door is fixed to the hoistway module by means of a temporary door mount. After placing the hoistway module on an underlying hoistway module, the hoistway module is moved from its transport state into an operating state. The temporary door mount is replaced by a permanent door mount fixed to the hoistway module below.

SUMMARY

One object of the invention is in particular to propose a hoistway module for forming a hoistway composed of stacked hoistway modules for an elevator installation, which allows for the most extensive preparatory work possible on the hoistway module and thus simple installation of the elevator installation. According to the invention, this object is achieved by a hoistway module having the features described below.

The hoistway module according to the invention for forming a hoistway composed of stacked hoistway modules for an elevator installation has a first side wall having a door opening, a second side wall adjoining the first side wall at an angle other than 180° and a hoistway door arranged in the door opening and having a door sill. According to the invention, the door sill of the hoistway door is fixed to the second side wall by means of a final door sill mount. Fixing the door sill on the second side wall using the final door sill mount allows the door sill to be fixed in such a way that after the hoistway module has been placed on top of an underlying hoistway module it can remain on the hoistway module and therefore does not need to be replaced or changed. The door sill can thus already be permanently fixed in the hoistway module during production of the hoistway module, i.e., in particular in a factory, without the need for any subsequent work.

Fixing the door sill to the second side wall using a final door sill mount is particularly advantageous for hoistway modules in which the door opening in the first side wall is open at the bottom, i.e., the first side wall has no horizontal region below the door opening. In this case, the door sill of the hoistway door cannot be fixed to the first side wall in the usual way.

The hoistway module according to the invention is in particular intended to be placed on top of an underlying hoistway module during the formation or construction of a hoistway. The locational or directional information used here, such as "bottom," "top," "vertical" or "horizontal," always refers to the orientation of the hoistway module in its operating state, i.e., when it forms part of the hoistway after its installation.

The hoistway module, at least with regard to the side walls, can, for example, consist mainly of concrete, in particular reinforced concrete, wood or metal, in particular metal profiles. When made from concrete, the hoistway module can have so-called lost formwork, i.e., formwork that is not removed after the concrete has hardened.

The hoistway module can be designed as a so-called top module or as a so-called base module. A top module closes off a hoistway at the top. It contains a top module ceiling, which acts as a hoistway ceiling that closes off the hoistway at the top. A drive machine for moving a car during operation of the elevator installation can be arranged in a top module. A plurality of base modules are arranged below a top module, which, together with the top module, form the hoistway. The hoistway modules are designed such that they can be placed on top of an underlying hoistway module, for example by means of a crane.

The hoistway module can also have more than one side wall having a door opening. In particular, it is possible for two opposite side walls to each have a door opening.

In particular, the second side wall adjoins the first side wall at an angle of 90°. The hoistway module and thus also the hoistway comprising this hoistway module has in particular a rectangular cross section. However, it can also have a different cross section. The cross section can, for example, also be round or oval, which means that the transition from the first side wall to the second side wall can be largely freely defined.

The door sill extends horizontally, closes off the hoistway door at the bottom and thus at least extends over almost the entire width of the door opening of the first side wall. In particular, it is designed as a flat rail, in particular made of metal, elongated in a main direction of extension. In the operating state of the elevator installation, the door sill covers in particular a joint running in the main direction of extension between the hoistway and a floor adjacent to the hoistway of a story of the building containing the hoistway.

Fixing the door sill by means of a final door sill mount is to be understood here as meaning that the door sill is fixed before positioning the hoistway module and is not or does not have to be detached or removed after it has been placed on top of an underlying hoistway module. However, it is quite possible that the position of the final door sill mount and thus also of the door sill will change slightly after being placed on top of an underlying hoistway module. This allows the door sill to be aligned or adjusted.

It is also possible that the fixation of the door sill is reinforced after it has been placed on top of an underlying hoistway module. For example, the door sill can be fixed to the underlying hoistway module with additional mounts without detaching or removing the existing final door sill mount.

A property of the final door sill mount is that it has a supporting function when fixing the door sill to the second side wall and thus to the hoistway module both in a transport state of the hoistway module, i.e., also in an operating state of the hoistway module, i.e., during operation of the elevator installation.

Operation of an elevator installation is to be understood here to mean that the car of the elevator installation is moved in the hoistway and, in particular, people and/or goods are transported in the car.

The hoistway module is in particular brought into the transport state in a factory. The side walls and, if applicable, a hoistway module ceiling are created and the hoistway door is arranged in the door opening, which closes the hoistway opening. In addition, other elevator components, such as guide rail pieces or a drive machine of the elevator installation, can be arranged on the hoistway module. The hoistway module is then transported to the construction site where the elevator installation and thus the hoistway are to be constructed. The hoistway module is placed on top of an underlying hoistway module while the hoistway module is still in the transport state. As the installation process is continued, the hoistway module is then moved from the transport state into its operating state. It is possible for a hoistway module to be placed in the operating state immediately after being positioned, or for all hoistway modules forming the hoistway to be stacked first and only then for the individual hoistway modules to be brought into the operating state.

In one embodiment of the invention, a third side wall opposite the second side wall adjoins the first side wall. The door sill of the hoistway door is then also fixed to the third side wall by means of the final door sill mount. This allows the door sill to be fixed in a particularly simple and cost-effective manner.

The door sill mount thus extends between the second and third side walls. In particular, the third side wall also adjoins the first side wall at an angle of 90° such that the third side wall runs in parallel with the second side wall.

It is also possible for the first side wall to have more than one door opening, in each of which a hoistway door is arranged. In this case, a plurality of elevator cars can be moved next to one another in the hoistway formed by the hoistway modules. In this case, the door sill mount can also extend between the second and third side walls and fix a plurality of door sills arranged next to one another to the second and third side walls. However, it is also possible that intermediate mounts, such as a projection running vertically inward into the hoistway or horizontally running supports, for example in the form of so-called divider bars or divider beams, are arranged between the door openings of the first side wall and the individual door sills are fixed by means of door sill mounts to the second side wall and to an intermediate bracket, to the third side wall and to an intermediate mount or to two intermediate mounts.

In one embodiment of the invention, the final door sill mount has a first wall bracket attached to the second side wall, a second wall bracket attached to the third side wall and a door sill support supported on the first wall bracket and the second wall bracket. This allows the door sill to be fixed in a simple yet stable manner. The use of a door sill support advantageously allows for the use of a standard door sill, which can also be used in a conventionally manufactured hoistway, i.e., one that does not consist of prefabricated hoistway modules. A wide range of such standard door sills are available at reasonable prices on the market.

The two wall brackets are in particular mainly L-shaped with one vertical and one horizontal leg and are in particular screwed to the second and third side walls. In particular, they are identical or similar and in particular made of metal.

The door sill support rests on the two wall brackets in particular and is thus supported on the wall brackets from above. The door sill support is in particular connected, in particular screwed, to the wall brackets. The door sill rests in particular on the door sill support and is thus supported on the door sill support from above. The door sill is in particular connected, for example screwed, to the door sill support.

In one embodiment of the invention, the first wall bracket and the second wall bracket are designed and fastened to the second side wall and the third side wall, respectively, in such a way that their position on the second side wall and the third side wall, respectively, can be changed together with the door sill support. For this purpose, the first wall bracket has a first adjustment assembly and the second wall bracket has a second adjustment assembly. This advantageously allows for further adjustment of the door sill mount and thus the door sill after the hoistway module has been placed on top of an underlying hoistway module without the door sill mount having to be undone or removed.

In particular, the wall brackets each have an elongated hole as an adjustment assembly, through which a screw or bolt projects for fixing them the second and third side wall. The elongated hole thus makes it possible to change the position of the wall bracket relative to the screw or bolt and thus relative to the second or third side wall after loosening the screw or a nut screwed onto the bolt.

In particular, it is possible that the position of the wall brackets on the second or third side wall can be changed in the vertical direction. The aforementioned elongated hole in a wall bracket therefore extends in particular vertically.

In one embodiment of the invention, the first wall bracket, the second wall bracket and the door sill support are designed such that the position of the door sill support relative to the first wall bracket fastened to the second side wall and relative to the second wall bracket fastened to the third side wall can be changed. For this purpose, the first wall bracket, the second wall bracket and/or the door sill support have suitable adjustment assemblies. This advantageously allows for further adjustment of the door sill mount and thus of the door sill after the hoistway module has been placed on top of an underlying hoistway module without the door sill mount having to be undone or removed.

The position of the door sill support relative to the wall brackets fastened to the side walls can change in particular along a main direction of extension of the door sill support or transversely to the main direction of extension of the door sill support. The main direction of extension of the door sill support extends between the first and the second wall bracket, i.e., in parallel with the first side wall between the second and the third side wall.

For this purpose, the door sill support has, for example, a so-called first T-slot as an adjustment assembly, which is open downward in the direction of the horizontally extending leg of the first wall bracket and extends transversely to the main direction of extension or in the main direction of extension of the door sill support. A head of a screw or a so-called slide nut can be arranged in the first T-slot, the position of which in the first T-slot can be changed in the direction of extension of the first T-slot. In this case, the first wall bracket has in particular one or more through-holes in its horizontally extending leg, which are aligned with the first T-slot of the door sill support. This allows the above-mentioned screw or a screw that can be screwed into the slide nut to project through a through-hole and, if necessary, to clamp the door sill support against the first wall bracket together with a nut. The same applies to the connection of the door sill support to the second wall bracket.

Additionally or alternatively, the above-described through-hole of the first wall bracket in the form of an adjustment assembly for the first wall bracket can have a diameter that is larger than the diameter of the screw projecting through the through-hole. This allows the position of the door sill support to also be changed transversely to the direction of extension of the first T-slot. Alternatively or additionally, it is possible that the head of the screw or the slide nut arranged in the first T-slot can also be moved transversely to the direction of extension of the first T-slot relative to the door sill support. The same applies to the connection of the door sill support to the second wall bracket. Other technical implementations are also possible, however.

In one embodiment of the invention, the door sill support and the door sill are designed and connected to one another in such a way that the position of the door sill relative to the door sill support can be changed. For this purpose, the door sill support and/or the door sill has/have suitable adjustment assemblies. This advantageously allows for further adjustment of the door sill mount and thus of the door sill after the hoistway module has been placed on top of an underlying hoistway module without the door sill mount having to be undone or removed.

The position of the door sill relative to the door sill support can be changed in particular along the main direction of extension of the door sill support or transversely to the main direction of extension of the door sill support.

For this purpose, the door sill has, for example, a second T-slot in the form of an adjustment assembly, which is open in the direction of the door sill support and runs in the main direction of extension or transversely to the main direction of extension of the door sill support. A head of a screw or a so-called slide nut can be arranged in the second T-slot, the position of which in the second T-slot can be changed in the direction of extension of the second T-slot. In this case, the door sill support has in particular one or more through-holes which are aligned with the second T-slot of the door sill. This allows the above-mentioned screw or a screw that can be screwed into the slide nut to project through a through-hole and, if necessary, to clamp the door sill against the door sill bracket together with a nut. Other technical implementations are also possible, however.

Additionally or alternatively, the above-described through-hole of the door sill support in the form of an adjustment assembly for the door sill support can, for example, have a diameter that is larger than the diameter of the screw projecting through the through-hole. This allows the position of the door sill relative to the door sill support to also be changed transversely to the direction of extension of the second T-slot. Alternatively or additionally, it is possible that the head of the screw or the slide nut arranged in the second T-slot can also be moved transversely to the direction of extension of the second T-slot relative to the door sill. Other technical implementations are also possible, however.

In one embodiment of the invention, the hoistway door of the hoistway module is fixed to the hoistway module by means of an upper door mount module. The hoistway door is thus fixed to the hoistway module via the door sill and the final door sill mount and additionally by means of the upper door mount module. This allows the hoistway door to be fixed in the hoistway module in a particularly stable manner.

In particular, the upper door mount module makes it possible to change the position of the hoistway door in the vertical direction within certain limits. For example, it comprises elongated holes that allow for adjustment in the vertical direction.

In one embodiment of the invention, the hoistway door has movable door segments for closing and opening the hoistway door, which segments are secured against movement when the hoistway module is in a transport state by means of a transport lock. This prevents damage to the door segments as a result of uncontrolled movements. The door segments are in particular secured in their open position. This advantageously makes the hoistway module accessible when in its transport state, which is helpful during transport and when placing it on an underlying hoistway module. In addition, the door segments are thereby protected against distortion or deformation during transport of the hoistway module.

For example, the hoistway module is in the transport state before it has been placed on top of an underlying hoistway module.

The transport lock in particular comprises a safety catch which is fastened to the second side wall and secures the door segments in their open position. Therefore, the transport lock is particularly simple and cost-effective to realize. The transport lock can, for example, consist of one or two Z-shaped brackets or a U-shaped catch made of wood or metal, which is/are screwed to the second side wall and engage(s) around the door segments in such a way that they hold the door segments in their open position. The hoistway door can have door segments that are moved in the same direction to open the hoistway door. In this case, the door segments are secured opposite the second side wall. The hoistway door can also have door segments that are moved in opposite directions to open the hoistway door. In this case, one door segment is secured opposite the second side wall and another door segment is secured opposite the third side wall.

Further advantages, features, and details of the invention can be found in the following description of embodiments and with reference to the drawings, in which identical or functionally identical elements are provided with identical reference signs. The drawings are merely schematic and are not to scale.

DETAILED DESCRIPTION

Figure 1:
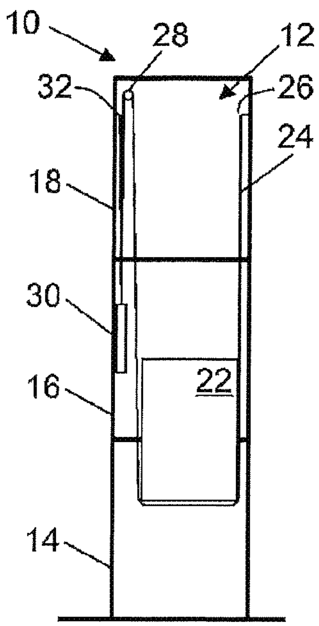
FIG. 1 shows an elevator installation comprising a car in a hoistway composed of three hoistway modules.

According to FIG. 1, an elevator system 10 has a hoistway 12 for a three-story building, which in the present exemplary embodiment is composed of a first basic module 14, a second basic module 16 and a top module 18. The hoistway 12 can comprise further second basic modules 16 depending on the number of floors. The shaft modules 14, 16, 18 are pre-produced in a factory and provided with elevator components. Subsequently, they are brought to the construction site and put on top of one another. The hoistway modules 14, 16, 18 all have a predominantly cuboid base shape. In particular, they are mainly made of wood. Of course, other materials such as concrete are also conceivable.

Figure 2:
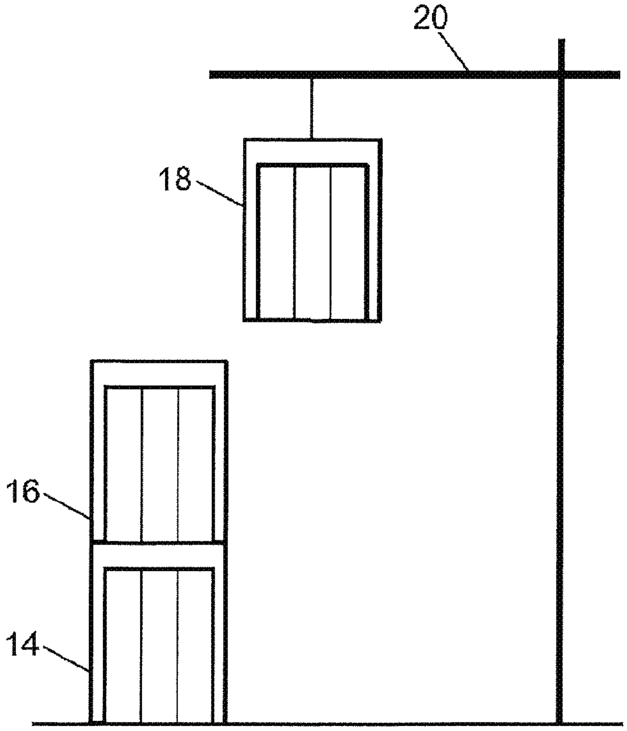
FIG. 2 shows a top module being placed on a yet unfinished hoistway of an elevator system.

FIG. 2 shows how the top module 18 is placed on the second basic module 16 from above by means of a crane 20. The second basic module 16 was previously placed in the same way onto the first basic module 14. The basic module 14 stands on a foundation (not shown) of the hoistway 12. The basic modules 14, 16 form a hoistway which is open at the top and has not yet been completed and which is closed off at the top by placing the top module 18 on it.

Moreover, the elevator installation 10 according to FIG. 1 has a car 22 which can be moved vertically in the hoistway 12 along guide rails (not shown). For this purpose, the elevator installation 10 has lifting gear 24, the first end 26 of which is fixed in the top module 18. It then extends downward and around the car 22 and is guided via a drive machine 28 arranged in the top module 18 opposite the first end 26 of the lifting gear 24. From there, it runs through a suspension of a counterweight 30 to its second end 32, which is fixed in the region of the drive machine 28. The drive machine 28 can move the lifting gear 24 and thus the car 22 in the hoistway 12.

Figure 3:
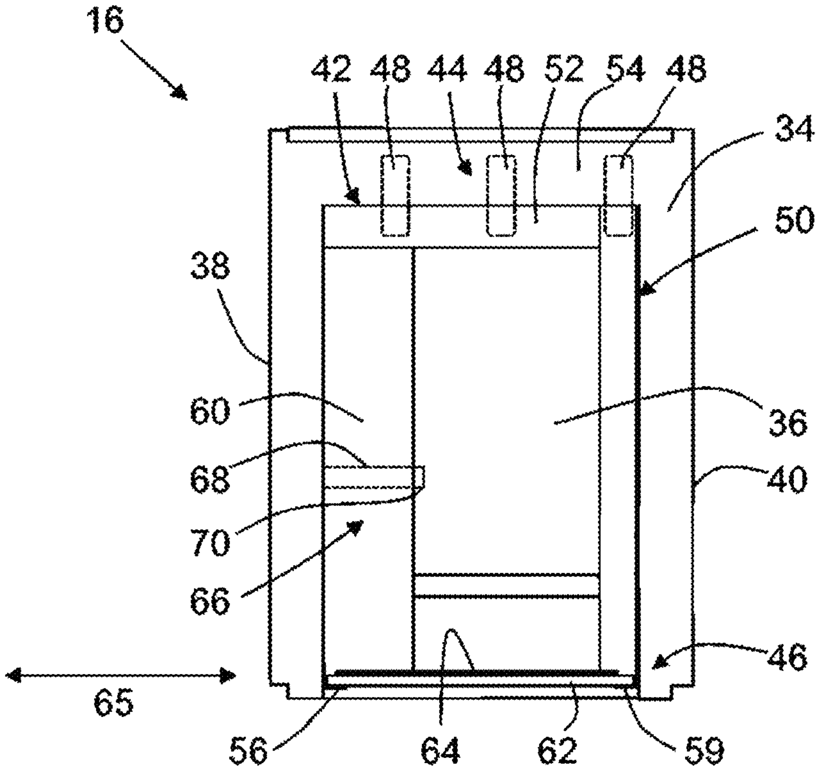
FIG. 3 shows a hoistway module with a door sill of a hoistway door fixed to the hoistway module by means of a final door sill mount.

According to FIG. 3, the second base module 16, i.e., a hoistway module for forming a hoistway 12 of an elevator installation 10, has a first side wall 34 with a door opening 36 that opens downward. The first side wall 34 is mainly shaped as an upside-down "U." In the illustration in FIG. 3, a second side wall 38 on the left side and a third side wall 40 on the right side each adjoin the first side wall 34 at an angle of 90°, i.e., not 180°.

A hoistway door 42 is arranged in the door opening 36. The first base module 14 and the top module 18 can be constructed in the same way as the second base module 16 described in detail below, at least with respect to the hoistway door. The hoistway door 42 is fixed, among other things, by means of an upper door mount module 44. The upper door mount module 44 has three metal tongues 48 by means of which an upper, horizontally extending part of a door frame 50, a so-called door transom 52, is screwed to a crossbeam 54 of the first side wall 34. Since the metal tongues 48 in FIG. 3 are arranged behind the door transom or jamb 52 and the crossbeam 54, they are shown by dashed lines.

The hoistway door 42 has a horizontally extending door sill 64, which closes off the hoistway door 42 at the bottom. It extends over almost the entire width of the door opening 36 of the first side wall 34 and is designed as a flat rail, in particular made of metal, elongated in a main direction of extension 65 of the door sill 64.

Figure 4:
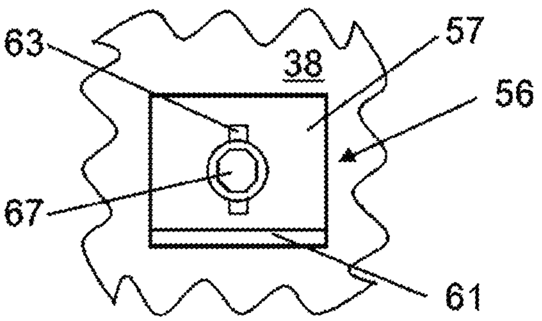
FIG. 4 is a plan view of a wall bracket of the final door sill mount screwed to a side wall of the hoistway module.
Figure 5:
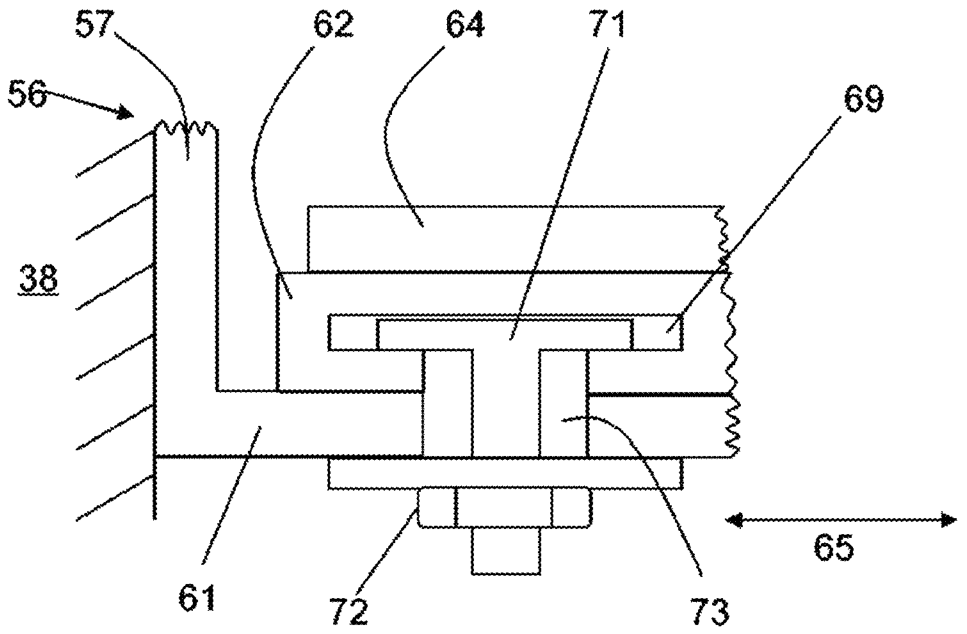
FIG. 5 is a detail of a section through a wall bracket, a door sill support of the final door sill mount and the door sill in a main direction of extension of the door sill support.

The door sill 64 is fixed or fastened by a final door sill mount 46 to the second side wall 38 and to the third side wall 40 and thus to the hoistway module 16. The door sill mount 46 has a first wall bracket 56 having two legs arranged perpendicularly to one another. A vertically extending leg (57 in FIGS. 4 and 5) of the first wall bracket 56 is screwed to the second side wall 38.

A second wall bracket 59 having the same design as the first wall bracket 56 is screwed to the third side wall 40 at the same height as the first wall bracket 56. A door sill support 62 of the final door sill mount 46, which in particular mainly consists of a metal profile, extends between the second side wall 38 and the third side wall 40. The door sill support 62 thus also extends in the main direction of extension 65 of the door sill 64. The door sill support 62 rests on the horizontally extending legs (61 in FIGS. 4 and 5) at its two ends and is thus supported on the two wall brackets 56, 59. The door sill 64 rests on the door sill support 62 and, during operation of the elevator installation 10, serves, among other things, to guide movable door segments of the hoistway door 42 (not visible in FIG. 3).

The above-mentioned movable door segments are arranged in FIG. 3 and thus behind a fixed door segment 60 in the transport state of the second base module 16 and are secured against movement by means of a transport lock 66 in the form of a Z-shaped safety catch 68. The safety catch 68 is screwed at its first end to the second side wall 38 and has a crosspiece 70 at its second end, which rests against the door segments in such a way that they cannot be moved away from the second side wall 38. The movable door segments are thus secured in their open position. Instead of the one Z-shaped safety catch, on each side of the door segments a Z-shaped safety catch or a U-shaped safety catch can be used.

The hoistway door 42 and thus also the door sill 64 must usually be aligned or adjusted after the base module 16 has been placed on top of the base module 14. The final door sill mount 46 offers different options, not all of which necessarily have to be implemented. What all options have in common is that the wall brackets do not have to be removed from the side walls for the purposes of alignment or adjustment, meaning that the final door sill mount does not have to be undone or removed. It is sufficient to loosen connections, for example screw connections between the wall brackets and the side walls, the wall brackets and the door sill support or the door sill support and the door sill, and tighten them again after the alignment or adjustment process.

A first way of aligning or adjusting the hoistway door 42 and thus the door sill 64 consists in changing the position of the wall brackets 56, 59 on the side walls 38, 40. As an example, according to FIG. 4, the vertical leg 57 of the first wall bracket 56, which rests on and is screwed to the second side wall 38, has an elongated hole 63. In the example shown in FIG. 4, the elongated hole 63 is vertical. It is also possible to provide a horizontal elongated hole. After loosening a screw 67 which projects through the elongated hole 63 and is screwed into the second side wall 38, the position of the first wall bracket 56 relative to the second side wall 38 can be changed within the frame defined by the elongated hole 63. The same applies to the second wall bracket 59.

Thus, the first wall bracket 56 and the second wall bracket 59 are designed and fastened to the second side wall 38 and the third side wall 40, respectively, in such a way that their position on the second side wall 38 and the third side wall 40, respectively, can be changed together with the door sill support 62. By changing the position of the first wall bracket 56 and/or the second wall bracket 59 as mentioned, the door sill 64 can be aligned or adjusted.

A second way of aligning or adjusting the hoistway door 42 and thus the door sill 64 consists in that the first wall bracket 56, the second wall bracket 59 and the door sill support 62 are designed and connected to one another in such a way that the position of the door sill support 62 relative to the first wall bracket 56 fastened to the second side wall 38 and relative to the second wall bracket 59 fastened to the third side wall 40 can be changed. As an example, according to FIG. 5, the door sill support 62 has a first T-slot 69 which is open downward in the direction of the horizontally extending leg 61 of the first wall bracket 56 and extends transversely to the main direction of extension 65 of the door sill support 62. A head of a screw 71 is arranged in the first T-slot 69, the position of which in the first T-slot 69 can be changed in the direction of extension of the first T-slot 69 and thus transversely to the main direction of extension 65 of the door sill support 62. The first wall bracket 56 has a through-hole 73 in its horizontally extending leg 61, which is aligned with the first T-slot 69 of the door sill support 62. The above-mentioned screw 71 projects through the through-hole 73 and, together with the nut 72 screwed onto the screw 71, clamps the door sill support 62 against the first wall bracket 56. The same applies to the connection of the door sill support 62 to the second wall bracket 59. The door sill 64 is arranged on the door sill support 62.

It is also possible that the first T-slot extends in the main direction of extension of the door sill support.

The through-hole 73 of the first wall bracket 56 has a diameter that is larger than the diameter of the screw 71 projecting through the through-hole 73. This allows the position of the door sill support 62 relative to the wall bracket 56 to also be changed transversely to the direction of extension of the first T-slot 69 and thus in the main direction of extension 65 of the door sill support 62. In addition, the first T-slot 69 is of such a width that the head of the screw 71 arranged in the first T-slot 69 can also be moved transversely to the direction of extension of the first T-slot 69 relative to the door sill support 62. The same applies to the connection of the door sill support to the second wall bracket.

A third way of aligning or adjusting the hoistway door 42 and thus the door sill 64 consists in that the door sill support 62 and the door sill 64 are designed and connected to one another in such a way that the position of the door sill 64 relative to the door sill support 62 can be changed. As an example, according to FIG. 6, the door sill 64 has a second T-slot 75 which is open in the direction of the door sill support 62 and runs in the main direction of extension 65 of the door sill support 62. The main direction of extension 65 of the door sill support 62 runs perpendicularly to the plane of the illustration in FIG. 6. A head of a screw 77 is arranged in the second T-slot 75, the position of which in the second T-slot 75 can be changed in the direction of extension of the second T-slot 75 and thus in the main direction of extension 65 of the door sill support 62 and the door sill 64. The door sill support 62 has a through-hole 79 which is aligned with the second T-slot 75 of the door sill 64. This allows the screw 77 to project through the through-hole 79 and, together with the nut 78 screwed onto the screw 77, to clamp the door sill 64 against the door sill holder 62.

It is also possible that the second T-slot runs transversely to the main direction of extension of the door sill support.

The through-hole 79 of the door sill support 62 has a diameter in width that is larger than the diameter of the screw 77 projecting through the through-hole 79. This allows the position of the door sill 64 relative to the door sill support 62 to also be changed transversely to the direction of extension of the second T-slot 75. In addition, the second T-slot 75 is of such a width that the head of the screw 77 arranged in the second T-slot 75 can also be moved relative to the door sill 64 transversely to the direction of extension of the second T-slot 75.

Figure 6:
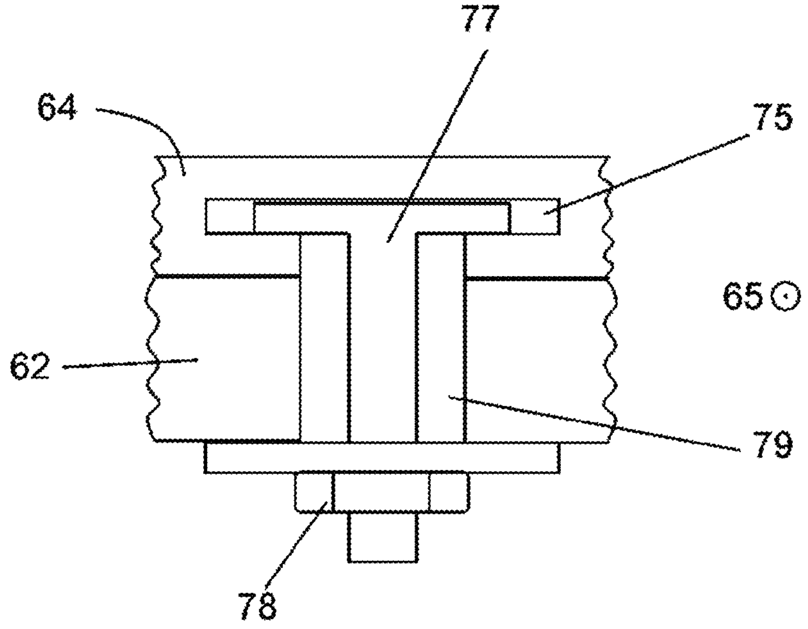
FIG. 6 is a detail of a section through the door sill and the door sill support transversely to the main direction of extension of the door sill support.

According to FIG. 6, the door sill 64 is fixed to the door sill support 62 by a plurality of connections distributed over the width of the hoistway door 42.

In addition, the hoistway door 42 can be adjusted by changing its position relative to the metal tongues 48 of the upper door mount module 44.

Finally, it should be noted that terms such as "having," "comprising," etc. do not preclude other elements or steps, and terms such as "a" or "an" do not preclude a plurality. Furthermore, it should be noted that features or steps which have been described with reference to one of the above exemplary embodiments may also be used in combination with other features or steps of other exemplary embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A hoistway module for forming a hoistway composed of stacked hoistway modules for an elevator installation, the hoistway module comprising:

a first side wall having a door opening;

a second side wall adjoining the first side wall at an angle other than 180°;

a hoistway door arranged in the door opening and having a door sill; and wherein the door sill is fixed to the second side wall by a final door sill mount.

2. The hoistway module according to claim 1 including a third side wall that is positioned opposite the second side wall and adjoins the first side wall, the door sill being fixed to the third side wall by the final door sill mount.

3. The hoistway module according to claim 2 wherein the final door sill mount includes a first wall bracket fastened to the second side wall, a second wall bracket fastened to the third side wall, and a door sill support supported on the first wall bracket and on the second wall bracket.

4. The hoistway module according to claim 3 wherein the first wall bracket, together with the door sill support, is adapted to change position on the second side wall and the second wall bracket, together with the door sill support, is adapted to change position on the third side wall.

5. The hoistway module according to claim 3 wherein the door sill support is connected to and adapted to change position relative to the first wall bracket and the second wall bracket.

6. The hoistway module according to claim 3 wherein the door sill support is connected to and adapted to change position relative to the door sill.

7. The hoistway module according to claim 1 wherein the hoistway door is fixed to the hoistway module by an upper door mount module.

8. The hoistway module according to claim 1 wherein the hoistway door includes movable door segments for closing and opening the hoistway door, the segments being secured against movement by a transport lock during a transport state of the hoistway module.

9. The hoistway module according to claim 8 wherein the transport lock includes a safety catch fastened to the second side wall and securing the movable door segments in an open position.

* * * * *